M. B. GRAHAM.
SCISSORS.
APPLICATION FILED AUG. 11, 1915.
1,181,871. Patented May 2, 1916.
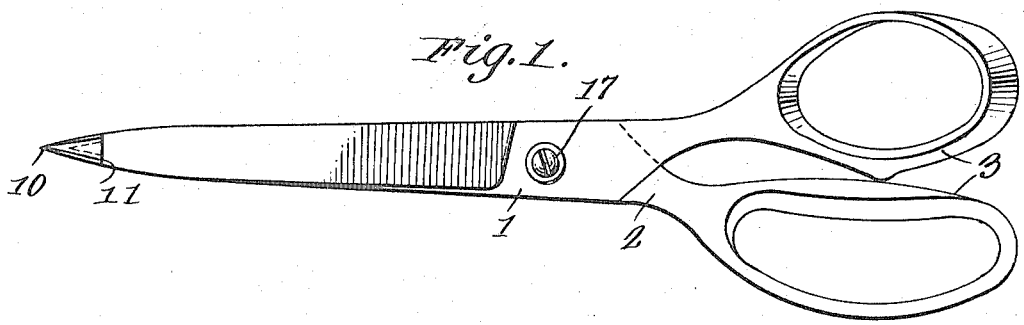
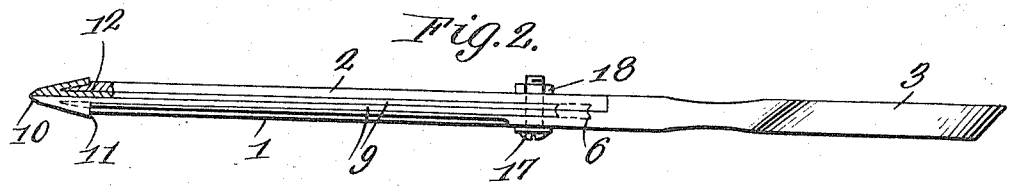
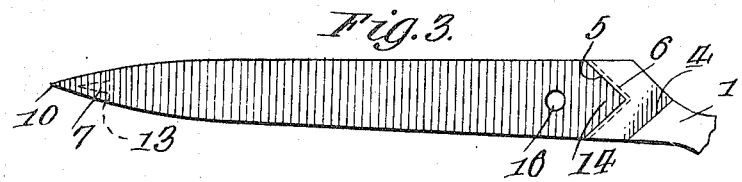
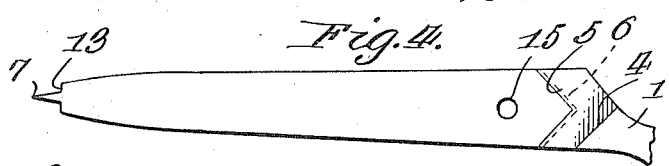
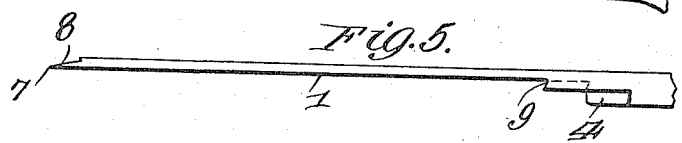
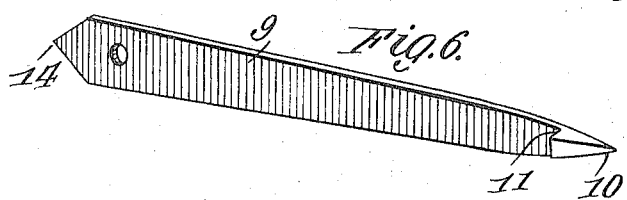
INVENTOR
Milton B. Graham.
WITNESSES
Guy M. Spring.
Wm. Webster Downing.
BY Richard B. Owen.
ATTORNEY

UNITED STATES PATENT OFFICE.

MILTON B. GRAHAM, OF WINDFALL, INDIANA.

SCISSORS.

1,181,871.  Specification of Letters Patent.  Patented May 2, 1916.

Application filed August 11, 1915. Serial No. 44,974.

*To all whom it may concern:*

Be it known that I, MILTON B. GRAHAM, a citizen of the United States, residing at Windfall, in the county of Tipton and State of Indiana, have invented certain new and useful Improvements in Scissors, of which the following is a specification.

My invention relates particularly to cutlery and more particularly to a pair of scissors.

The primary object of my invention resides in the provision of a pair of scissors having interchangeable blades for association with the shanks of the scissors so that by removing the blades they can be readily and expeditiously sharpened and by employing longer blades various sized scissors may be provided.

Another object of my invention resides in the provision of a novel means so associating the blades with the shanks of the scissors so that movement of the blades on the shanks is reduced to a minimum.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—Figure 1 is a front elevational view of my invention associated with a pair of scissors; Fig. 2 is a side elevational view of the same, a portion of one end thereof being broken away showing the manner in which the pointed end of the shank is associated with the pointed end of the blade; Fig. 3 is a front elevational view of one of the shanks showing the blade applied thereto; Fig. 4 is a similar view with the blade removed; Fig. 5 is a side elevational view of one of the shanks with the blade removed; Fig. 6 is a perspective view of one of the blades; and Fig. 7 is a transverse sectional view taken through the shanks and the blades.

Referring more particularly to the drawings in which similar reference numerals designate like or corresponding parts throughout the different views, I provide a pair of scissors, in this instance embodying complemental shanks 1 and 2 having complemental handles 3 extending from one end thereof. Each of the shanks are provided with shoulders 4 which are adapted to abut each other when the shanks are secured together. The shanks are further provided on their inner surfaces with preferably substantially V-shaped shoulders 5, the latter being beveled inwardly as indicated by the numeral 6, the outer end of the reduced portions of the shanks being reduced to provide points 7, the upper surfaces of which are tapered as at 8 toward the inner surface. Associated with each of the inner reduced surfaces of the shanks are my improved blades 9, the side edges of which conform substantially to the side edges of the shanks. The outer ends of the blades 9 are pointed as at 10 and enlarged on their inner faces to provide shoulders 11, in each of which is formed a pocket 12 for receiving one of the complemental points 7 of the shank, the shoulders 11 abutting the shoulders 13 when the points 7 are provided. When the sockets 12 are arranged in engagement with the points 7, the opposite ends of the blades which are pointed as indicated by the numeral 14 and beveled, are engaged with the shoulders 5 having the beveled edges 6 in such a manner that the inner faces of the blades and the inner faces of the shanks will lie in intimate contact with each other throughout their length as illustrated to advantage in Fig. 2 of the accompanying drawings.

Suitable means are provided for securing the shanks together. In accomplishing such action, the shoulders 4 are arranged in intimate contact with each other and the blades and the outer ends of the shanks are arranged in alinement with each other so that the openings 15 in the shank will be arranged in registration with the openings 16 in the blades, whereupon a bolt 17 is inserted through the openings, the threaded terminal of which is engaged by a suitable adjusting element preferably a nut 18 for removably clamping the faces of the blades in intimate contact with each other throughout their length as illustrated to advantage in Fig. 2 of the accompanying drawings.

It is obvious that the distance between the shoulder 11 and the point 10 of the blades may be enlarged to consequently lengthen the blades so that various lengths of scissors may be had. In reducing the invention to practice several sizes of blades of various lengths can be sold with the shanks.

Although I have shown and described the preferred embodiment of my invention, I desire to be understood that I am not to be limited to the exact details shown; however, I desire that great stress be laid upon the various length blades removably associated with the shanks for providing a pair of scissors that are capable of being lengthened. Also a pair having efficient means whereby the blades may be expeditiously sharpened. Attention is especially directed to the construction of the points and shoulders 13 and shoulder 11 as well as the beveled points 14 and beveled shoulders 5 which coöperate with each other to reduce the transverse and longitudinal movement of the blades on the shank to a minimum.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A pair of scissors including a pair of complemental shanks having their inner surfaces reduced intermediate their ends to provide V-shaped blade receiving shoulders, said shoulders being beveled, complemental handles formed on the inner ends of said shanks, the opposite ends of said shanks being reduced and pointed, blades associated with said shanks, said blades having their inner ends pointed and beveled for engagement with said beveled shoulders, the outer ends of said blades being pointed and enlarged and provided with sockets for engagement with the free pointed ends of the shanks, and means for removably fastening said shanks together when the blades are arranged in position.

2. A pair of scissors including complemental shanks having their inner adjacent faces reduced to provide V-shaped blade receiving beveled shoulders and further provided with alining openings in their reduced portions, handles on the inner ends of the shanks, the outer ends of the shanks being reduced and pointed, blades arranged over the pointed ends of the shanks and beneath the beveled shoulders to contact intimately with the shanks, the blades being provided with openings therein arranged in alinement with the openings in the shanks, and common means engaging the openings for removably fastening the blades on the shanks to prevent movement thereof and for removably pivoting the shanks together.

In testimony whereof I affix my signature in presence of two witnesses.

MILTON B. GRAHAM.

Witnesses:
 H. W. BROWN,
 CARL SCUDDER.